(12) United States Patent
Wu

(10) Patent No.: US 9,977,279 B2
(45) Date of Patent: May 22, 2018

(54) COLOR FILTER SUBSTRATE AND MANUFACTURING METHOD THEREOF, AND DISPLAY DEVICE

(71) Applicants: BOE Technology Group Co., Ltd., Beijing (CN); Hefei Xinsheng Optoelectronics Technology Co., Ltd., Anhui (CN)

(72) Inventor: Peng Wu, Beijing (CN)

(73) Assignees: BOE Technology Group Co., Ltd., Beijing (CN); Hefei Xinsheng Optoelectronics Technology Co., Ltd., Anhui (CN)

( * ) Notice: Subject to any disclaimer, the term of this patent is extended or adjusted under 35 U.S.C. 154(b) by 0 days. days.

(21) Appl. No.: 15/162,692

(22) Filed: May 24, 2016

(65) Prior Publication Data

US 2017/0052406 A1 Feb. 23, 2017

(30) Foreign Application Priority Data

Aug. 19, 2015 (CN) .......................... 2015 1 0512949

(51) Int. Cl.
*G02B 5/22* (2006.01)
*G02F 1/1335* (2006.01)
*G02F 1/13* (2006.01)
*G02F 1/1333* (2006.01)

(52) U.S. Cl.
CPC ...... *G02F 1/133512* (2013.01); *G02F 1/1309* (2013.01); *G02F 1/133514* (2013.01); *G02F 2001/133334* (2013.01); *G02F 2001/133388* (2013.01)

(58) Field of Classification Search
CPC ....... G02F 1/1309; G02F 2001/133334; G02F 2001/133388; G02F 1/133514; G02F 1/133512; G02F 1/1368; G02F 1/136286; G02F 2201/121; G02F 1/134309;
(Continued)

(56) References Cited

U.S. PATENT DOCUMENTS 6,665,045 B2 * 12/2003 Kanayama ........ G02F 1/134309
349/192
2004/0233375 A1 * 11/2004 Chung .................. G02F 1/1339
349/153
(Continued)

FOREIGN PATENT DOCUMENTS

CN  1834738 A   9/2006
CN  103913884 A 7/2014

OTHER PUBLICATIONS

Sep. 14, 2017—(CN) First Office Action Appn 201510512949.4 with English Tran.
(Continued)

*Primary Examiner* — Jade R Chwasz
(74) *Attorney, Agent, or Firm* — Banner & Witcoff, Ltd.

(57) ABSTRACT

A color filter substrate and a manufacturing method thereof, and a display device are provided. The color filter substrate includes a base substrate and a black matrix arranged on the base substrate, the color filter substrate further includes a via hole arranged in a non-display region, and viewing from a side of the base substrate opposite to the black matrix, the via hole exposes a part of the black matrix in contact with the via hole.

11 Claims, 2 Drawing Sheets

(58) Field of Classification Search
CPC ............... G02F 1/13394; G02F 1/1339; G02F 1/136227; G02F 1/161
USPC ................ 359/885, 891, 892, 580, 582, 893
See application file for complete search history.

(56) References Cited

U.S. PATENT DOCUMENTS

2013/0335662 A1* 12/2013 Chang .................. G02F 1/1309
  349/43
2015/0002956 A1*  1/2015 Lu .......................... G02B 5/201
  359/891

OTHER PUBLICATIONS

Nov. 23, 2017—(CN) Second Office Action Appn 201510512949.4 with English Tran.

* cited by examiner

COLOR FILTER SUBSTRATE AND MANUFACTURING METHOD THEREOF, AND DISPLAY DEVICE

This application claims priority to and the benefit of Chinese Patent Application No. 201510512949. 4 filed on Aug. 19, 2015, which application is incorporated herein in its entirety.

TECHNICAL FIELD

Embodiments of the present disclosure relate to a color filter substrate and a manufacturing method thereof, and a display device.

BACKGROUND

A Liquid Crystal Display (LCD) has been widely applied to a display field.

It is well known that a black matrix itself is not charged. However, during a normal operating process of the LCD, the black matrix may induce a charge, and therefore, the black matrix has a certain voltage value, to maintain a balance of an in-cell electric field. Meanwhile during production and subsequent transport and evaluation processes of the LCD, due to equipment and personnel, static electricity may be accumulated on a color filter substrate, and the static electricity enables an inductive potential on the black matrix to be unbalanced in distribution, and then deflection of liquid crystal is influenced, thereby influencing a display effect of the LCD finally.

Therefore, detecting a voltage value of the black matrix may effectively reflect a static electricity accumulation degree of the color filter substrate, and then a data support is provided for subsequently removing the static electricity on the color filter substrate. An existing method for measuring a voltage of the black matrix is to open glass at one corner of the LCD, so as to expose a film layer of the color filter substrate, then, scrape off a planarization layer on the color filter substrate to expose the black matrix, and subsequently coat the exposed black matrix with a silver paste and then perform voltage measurement. After the voltage of the black matrix is measured through the above-described method, the LCD has been already damaged, and cannot be used any longer subsequently. For a manufacturer, it is a great waste.

SUMMARY

Embodiments of the present disclosure relate to a color filter substrate and a manufacturing method thereof, and a display device, and for the display device comprising the color filter substrate, a voltage value of the black matrix may be measured by a via hole in the color filter substrate, thereby avoiding that the voltage of the black matrix is measured in a corner prizing manner, and further a damage to a display device.

In one aspect, an embodiment of the present disclosure provides a color filter substrate, comprising a base substrate and a black matrix arranged on the base substrate, the color filter substrate further comprising a via hole arranged in a non-display region, and viewing from a side of the base substrate opposite to the black matrix, the via hole exposing a part of the black matrix in contact with the via hole.

In another aspect, an embodiment of the present disclosure provides a display device, comprising the color filter substrate as mentioned above.

In another aspect, an embodiment of the present disclosure provides a manufacturing method for the color filter substrate as mentioned above, the color filter substrate comprising a base substrate and a black matrix, and the method comprising: forming a via hole in a non-display region of the color filter substrate, and viewing from a side of the base substrate opposite to the black matrix, the via hole exposing a part of the black matrix in contact with the via hole.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
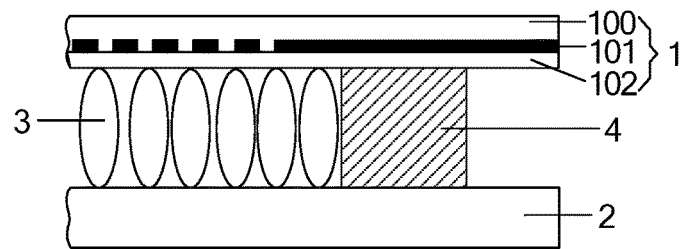
FIG. 1 is a structural schematic diagram of an LCD.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

In the description of the present invention, it should be noted that, azimuth or positional relationships indicated by terms such as "up", "down" and so on, are based on the azimuth or positional relationships shown in the drawings, which are only to facilitate description of the invention and simplify the description, but not to indicate or imply that the device or components must have a specific azimuth, or be constructed or operated in the specific azimuth, which thus cannot be understood as a limitation to the invention.

As shown in FIG. 1, an LCD includes a color filter substrate 1 and an array substrate 2 that are cell-assembled, and liquid crystal 3 and a sealant 4 formed therebetween, wherein, the color filter substrate 1 comprises a base substrate 100 and a black matrix 101 and a planarization layer 102 that are formed on the base substrate 100.

A First Embodiment

Figure 2:
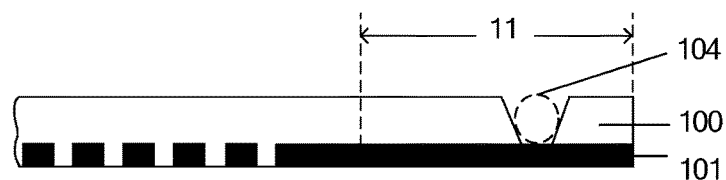
FIG. 2 is a structural schematic diagram of a color filter substrate provided by an embodiment of the present disclosure.

An embodiment of the present disclosure provides a color filter substrate, with reference to FIG. 2, comprising a base substrate 100 and a black matrix 101 arranged on the base substrate 100; the color filter substrate further comprises a via hole 104 arranged in a non-display region 11, and viewing from one side of the base substrate 100 away from the black matrix 101, the via hole 104 exposes a part of the black matrix 101 in contact with the via hole 104.

It should be noted that, the color filter substrate may be cell-assembled with an array substrate through a sealant to form a display device, wherein, a region for realizing display of the color filter substrate is a display region, and the non-display region means a region except the region for realizing the display, i. e. , the display region. The embodiment of the present disclosure will not specifically limit regions that are included in the non-display region. Exemplarily, with reference to FIG. 4, the non-display region 11 may include a sealant region 12 and an edge region 13 located around the sealant region 12, wherein, the sealant region 12 is a region for arranging the sealant of the color filter substrate. Of course, the non-display region may also include other regions, which will not be repeated here.

In the color filter substrate, the embodiment of the present disclosure will not limit a specific position where the via hole is located in the non-display region, a number and a size of the via hole, which may be decided in accordance with an actual condition.

In the color filter substrate, the embodiment of the present disclosure will not limit a layer structure between the base substrate and the black matrix. Exemplarily, the base substrate and the black matrix may be in direct contact, i. e. , other film layers are not arranged therebetween; alternatively, other film layers may also be arranged between the base substrate and the black matrix, such as a buffer layer, which will not be specifically limited here. In order to simplify a process, the former is selected generally. If the base substrate and the black matrix are in contact, the via hole may be arranged in the base substrate and penetrates through the base substrate so as to expose a part of the black matrix in contact with the via hole. If the other film layers are also arranged between the base substrate and the black matrix, the via hole may penetrate through the base substrate, and the film layers located between the base substrate and the black matrix, so as to expose the part of the black matrix in contact with the via hole. It is illustrated with that the base substrate and the black matrix are in contact as an example in the embodiment of the present disclosure and the drawing.

In the color filter substrate, only the color filter substrate and a structure related to an inventive point are introduced in detail in the embodiment of the present disclosure, and those skilled in the art can know according to common knowledge and the prior art that, the color filter substrate may also comprise the other film layers, for example, the color filter substrate may also comprise a color filter layer and the like.

Figure 3:
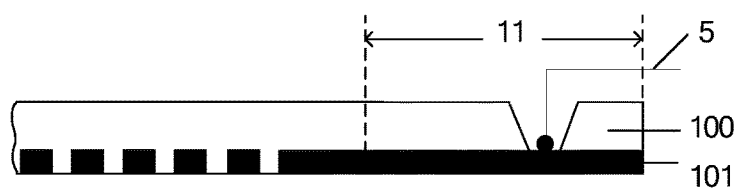
FIG. 3 is a schematic diagram for putting a test probe in the via hole shown in FIG. 2, to detect a voltage of a black matrix.

The embodiment of the present disclosure provides a color filter substrate, the color filter substrate comprising a base substrate and a black matrix arranged on the base substrate; a non-display region of the color filter substrate is provided with a via hole, and viewing from one side of the base substrate opposite to the black matrix, the via hole exposes a part of the black matrix in contact with the via hole. Thus, when a voltage of the black matrix is tested, with reference to FIG. 3, a test probe 5 may be arranged in the via hole, the test probe 5 is in contact with the black matrix 101, and then a voltage value of the black matrix 101 is obtained, thereby avoiding that the voltage of the black matrix is measured in a corner prizing manner, and further a damage to a display device.

Figure 4:
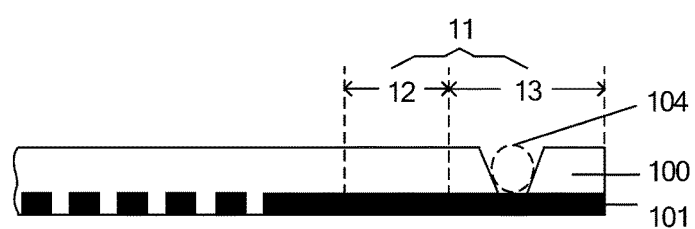
FIG. 4 is a structural schematic diagram of another color filter substrate provided by an embodiment of the prevent disclosure.

Alternatively, with reference to FIG. 4, the non-display region 11 may include a sealant region 12 and an edge region 13 located around the sealant region 12, and the via hole 14 is located in the edge region 13.

It should be noted here that, the sealant region 12 is a region for arranging a sealant of the color filter substrate. As an inductive potential of the black matrix located in the edge region may be easily influenced by the outside, the via hole is arranged in the edge region, which is more conductive to reflecting a static electricity accumulation degree of the color filter substrate.

Figure 5:
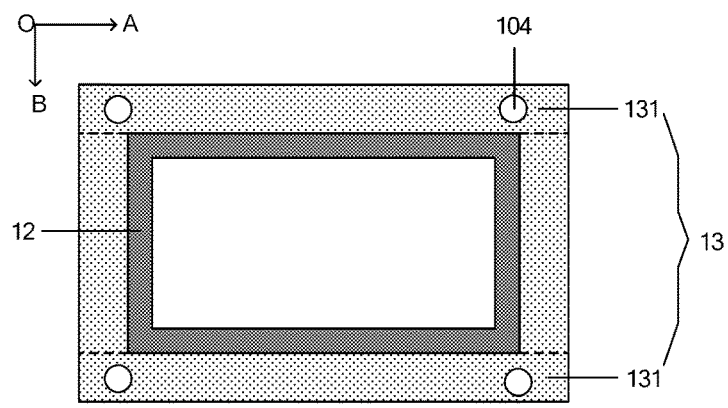
FIG. 5 is a structural schematic diagram of another color filter substrate provided by an embodiment of the prevent disclosure.

Exemplarily, with reference to FIG. 5, the edge region 13 includes two opposite sub-edge regions 131, and the via holes 104 are at least located in the two opposite sub-edge regions 131.

It should be noted here that, the sub-edge region 131 may be a region along an OA direction shown in FIG. 5, and of course may also be a region along an OB direction shown in FIG. 5, which will not be specifically limited here; it is illustrated with that the sub-edge region 131 is the region along the OA direction shown in FIG. 5 as an example in the embodiment of the present disclosure and the drawing. In addition, the via holes 104 are at least located in the two opposite sub-edge regions 131, which means: the via holes 104 may be located in the two opposite sub-edge regions 131, i. e. , the via holes 104 are respectively arranged in the two opposite sub-edge regions 131; of course, the via holes 104 may also be located in a region except the two opposite sub-edge regions 131, which will not be specifically limited here. It is illustrated with that the via holes 104 are located in the two opposite sub-edge regions 131, and the number of the via holes is four as an example in the embodiment of the present disclosure and the drawing.

According to the above-described color filter substrate, the via holes are at least arranged in the two opposite sub-edge regions, and thus, multiple voltage values of the black matrix at different positions can be obtained, which is more conductive to subsequently analyzing static electricity accumulation condition of the color filter substrate.

Figure 2A:
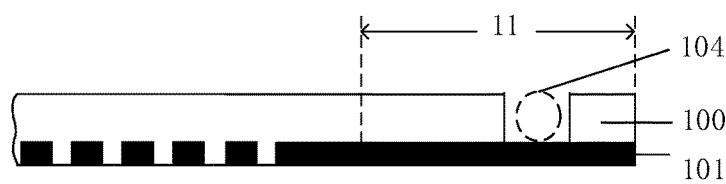
FIG. 2a is another structural schematic diagram of a color filter substrate provided by an embodiment of the present disclosure.
Figure 5A:
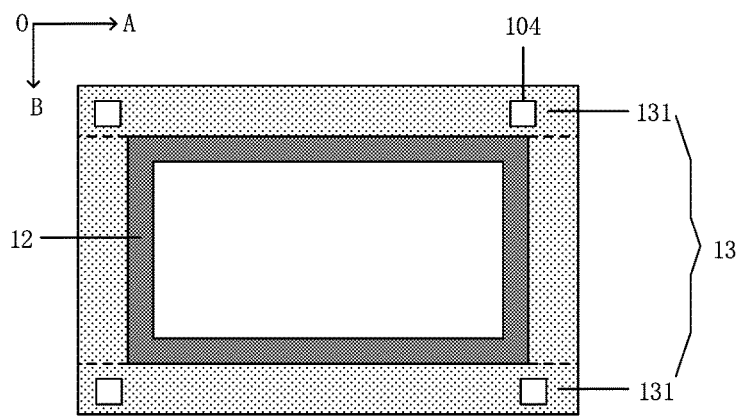
FIG. 5a is another structural schematic diagram of another color filter substrate provided by an embodiment of the prevent disclosure.

Alternatively, the via hole may be in a shape of a cuboid, a circular truncated cone or a truncated pyramid. It should be noted that, the circular truncated cone refers to that a circular cone is truncated with a plane parallel with a bottom surface of the circular cone, and a part between the bottom surface and a cross section is called the circular truncated cone; the truncated pyramid refers to that a pyramid is truncated with a plane parallel with a bottom surface of the pyramid, and a part between the bottom surface and a cross section is called the truncated pyramid. Thus manufacturing is easy and the via hole is large in volume, which is conductive to subsequently receiving the test probe. It is illustrated with that the via hole is in the shape of the circular truncated cone as an example in the embodiment of the present disclosure and the drawing. The cross-sectional view of the via hole having a shape of a cuboid is shown in FIG. 2a and the plan view of the via hole having a shape of a cuboid is shown in FIG. 5a, the cross-sectional view of the via hole having a shape of a truncated pyramid is shown in FIG. 2 and the plan view of the via hole having a shape of a truncated pyramid is shown in FIG. 5a.

Exemplarily, as a diameter of the test probe is 3.5μm generally, in consideration of the diameter of the test probe and a process level of manufacturing the via hole, an aperture range of the via hole may be 3.5 μm-25 μm, for example, an aperture of the via hole may be 5 μm, 10 μm, 15 μm or 20 μm. It may be decided in accordance with an actual condition, and will not be specifically limited here.

Figure 6:
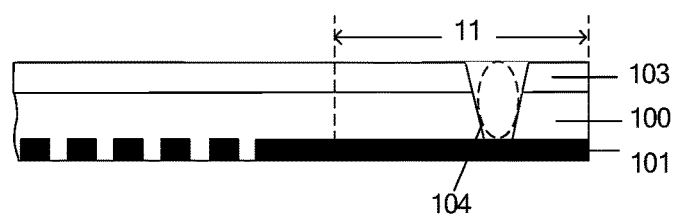
FIG. 6 is a structural schematic diagram of another color filter substrate provided by an embodiment of the prevent disclosure.

Alternatively, with reference to FIG. 6, one side of the base substrate 100 not provided with the black matrix 101 is provided with a conducting layer 103, and the via hole 104 also penetrates through the conducting layer 103. It should be noted that, the embodiment of the present disclosure does not limit a material of the conducting layer, for example, the material of the conducting layer may be a metal or a metal oxide. If the material of the conducting layer is the metal, as a light transmittance of the metal is low, in order to increase a light transmittance of the color filter substrate, the conducting layer may be made to be thin in thickness properly. Thus, a silver paste may be arranged on the conducting layer, and the silver paste is electrically connected with a ground wire of an array substrate, thereby guiding static electricity on the color filter substrate out.

Exemplarily, the conducting layer may be an Indium Tin Oxide (ITO) layer, and as an ITO is transparent, the light transmittance of the color filter substrate cannot be reduced by adopting the ITO as the conducting layer, and then a display effect of the display device comprising the color filter substrate cannot be influenced.

A Second Embodiment

Figure 7:
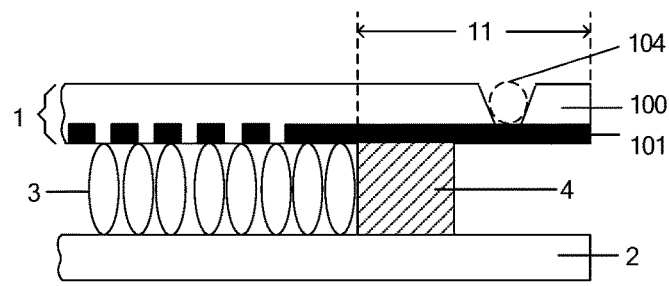
FIG. 7 is a structural schematic diagram of an LCD provided by an embodiment of the prevent disclosure.

An embodiment of the present disclosure provides a display device, with reference to FIG. 7, the display device comprising any color filter substrate 1 provided by the first embodiment, an array substrate 2, and a liquid crystal 3 and a sealant 4 located between the color filter substrate 1 and the array substrate 2. The display device may be a display device, such as a liquid crystal display and any product or component with a display function, such as a television, a digital camera, a mobile phone and a flat computer including the display device.

A Third Embodiment

An embodiment of the present disclosure provides a manufacturing method for any color filter substrate provided by the first embodiment of the present disclosure; the color filter substrate comprises a base substrate and a black matrix, the color filter substrate formed by using the method may refer to FIG. 2, and the method comprises:

Forming a via hole 104 in a non-display region 11 of the color filter substrate, and viewing from a side of the base substrate 100 opposite to the black matrix, the via hole 104 exposing a part of the black matrix 101 in contact with the via hole 104.

It should be noted here that, only the color filter substrate and a structure related to an inventive point are introduced in detail in the embodiment of the present disclosure, and those skilled in the art can know according to common knowledge and the prior art that, the manufacturing method for the color filter substrate may further comprise: forming the black matrix and the like.

It should be further noted that, the embodiment of the present disclosure will not limit a forming order of the via hole and the black matrix. Exemplarily, if the base substrate and the black matrix are in contact, the forming the via hole in the non-display region of the color filter substrate may include: firstly forming the via hole in the base substrate, and then forming the black matrix on the base substrate; alternatively, firstly forming the black matrix in the base substrate, and then forming the via hole, which will not be limited here. In order to avoid an influence on the black matrix when the via hole is formed, the former may be selected. If other film layer is also formed between the base substrate and the black matrix, for example, a buffer layer, the forming the via hole in the non-display region of the color filter substrate may include: firstly forming the buffer layer on the base substrate, subsequently forming the via hole penetrating through the base substrate and the buffer layer, and then forming the black matrix on the buffer layer; alternatively, forming the buffer layer and the black matrix on the base substrate in sequence, and then forming the via hole, the via hole penetrating the base substrate and the buffer layer, which will not be limited here. In order to avoid the influence on the black matrix when the via hole is formed, the former can be selected.

The embodiment of the present disclosure provides a manufacturing method for a color filter substrate, the color filter substrate formed by using the manufacturing method comprises a base substrate and a black matrix arranged on the base substrate, a non-display region of the color filter substrate is provided with a via hole, and viewing from a side of the base substrate opposite to the black matrix, the via hole exposes a part of the black matrix in contact with the via hole. Thus, for a display device comprising the color filter substrate, when a voltage of the black matrix is tested, testing on the voltage of the black matrix may be realized through the via hole, thereby avoiding that the voltage of the black matrix is measured in a corner prizing manner, and further damage to a display device.

Considering that the base substrate is relatively thick generally, and an aperture of the via hole is relatively small, in order to form the via hole more precisely, exemplarily, the forming the via hole in the non-display region of the color filter substrate may include: forming the via hole in the non-display region of the color filter substrate by adopting a laser drilling method.

Of course, it should be noted that a method for forming the base substrate and the via hole is not limited herein; exemplarily, the via hole may also be formed by adopting a mechanical drilling method.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The present application claims priority of Chinese Patent Application No. 201510512949.4 filed on Aug. 19, 2015, the present disclosure of which is incorporated herein by reference in its entirety as part of the present application.

The invention claimed is:

1. A color filter substrate, comprising a base substrate and a black matrix arranged on the base substrate, the color filter substrate further comprising a via hole arranged in a non-display region, and viewing from a side of the base substrate opposite to the black matrix, the via hole exposing a part of the black matrix in contact with the via hole, wherein the color filter substrate and an array substrate are cell-assembled, a liquid crystal is located between the color filter substrate and the array substrate, and viewing from a side of the base substrate away from the liquid crystal, the via hole exposes the part of the black matrix in contact with the via hole, and wherein a measuring device is in direct contact with the black matrix from outside of the color filter substrate and the array substrate after cell-assembled.

2. The color filter substrate according to claim 1, wherein the non-display region includes a sealant region and an edge region located around the sealant region, and the via hole is located in the edge region.

3. The color filter substrate according to claim 2, wherein the edge region includes two opposite sub-edge regions, and the via hole is at least located in the two opposite sub-edge regions.

4. The color filter substrate according to claim 1, wherein the via hole is in a shape of a cuboid, a circular truncated cone or a truncated pyramid.

5. The color filter substrate according to claim 4, wherein an aperture range of the via hole is 3.5 μm-25 μm.

6. The color filter substrate according to claim 1, wherein a side of the base substrate not provided with the black matrix is provided with a conducting layer, and the via hole also penetrates through the conducting layer.

7. The color filter substrate according to claim 6, wherein the conducting layer is an ITO layer.

8. The color filter substrate according to claim 1, further comprising:

another film layer, formed between the base substrate and the black matrix, wherein the via hole penetrates through the another film layer and the base substrate, to expose the black matrix.

9. A display device, comprising the color filter substrate according to claim 1, wherein the black matrix is exposed by the via hole, and the measuring device is in direct contact with the black matrix from outside of the display device.

10. A manufacturing method for the color filter substrate according to claim 1, the method comprising:

forming the via hole in the non-display region of the color filter substrate.

11. The manufacturing method according to claim 10, wherein the forming the via hole in the non-display region of the color filter substrate comprises:

forming the via hole in the non-display region of the color filter substrate by adopting a laser drilling method.

* * * * *